United States Patent Office 3,122,562
Patented Feb. 25, 1964

3,122,562
2-FURYL AND 2-PYRAN-2-YL-4,7-DIHYDRO-
1,3-DIOXEPINS
George B. Sterling, Midland, and Chester E. Pawloski,
Bay City, Mich., assignors to The Dow Chemical Company, Midland, Mich., a corporation of Delaware
No Drawing. Filed Mar. 5, 1962, Ser. No. 177,168
2 Claims. (Cl. 260—338)

The present invention is directed to dioxepins corresponding to the formula:

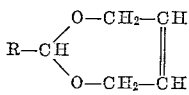

In this and succeeding formulae, R represents 2-furyl or 3,4-dihydro-2H-pyran-2-yl. These compounds are liquid materials which are somewhat soluble in many common organic solvents and of low solubility in water. They are useful as parasiticides for the control of insects, worms, trash fish and fungal organisms such as *Aspergillus terreus*. They are also useful in the manufacture of improved latex polymers and vinyl rubber products such as copolymers with butadiene. The latexes and vinyl rubber products are found to have very desirable and improved tensile, soft, lubricous and elastic properties.

The novel dioxepin compounds are prepared by reacting 2-butene-1,4-diol with a suitable dialkoxyalkane and 2-furaldehyde or 3,4-dihydro-2H-pyran-2-carboxaldehyde. Suitable dialkoxyalkanes include 2,2-dimethoxybutane, 2,2-dibutoxypropane, 3,3-dimethoxypentane, 2-butoxy-2-methoxypropane, 1,1-diethoxyethane, dimethoxy cyclohexane, α,α-dimethoxytoluene and the like. The reaction is carried out in the presence of a small and catalytic amount of an acidic catalyst such as sulfuric acid, dichloroacetic acid, dichloropropionic acid, phosphoric acid, trichloroacetic acid and the like. Good results are obtained when employing substantially equimolecular proportions of the butenediol, aldehyde and dialkoxyalkane materials. Where optimum yields are desired, it is preferred to employ an excess of the aldehyde and dialkoxyalkane reagents. The reaction conveniently is carried out in an organic liquid as reaction medium and takes place readily at temperatures of from 10° to 100° C. In carrying out the reaction, the butenediol, aldehyde and dialkoxyalkane reagents are mixed together with a catalytic amount of the acid catalyst and the resulting mixture maintained for a short period in the reaction temperature range. Upon completion of the reaction, the reaction mixture is fractionally distilled under reduced pressure to obtain the desired prdouct as a liquid material.

The following examples merely illustrate the invention and are not to be construed as limiting.

*Example 1.—2-(2-Furyl)-4,7-Dihydro-1,3-Dioxepin*

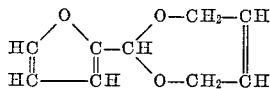

2-butene-1,4-diol (264 grams; 3 moles), 312 grams (3 moles) of 2,2-dimethoxypropane and 288 grams (3 moles) furaldehyde were mixed together with stirring in 200 milliliters of benzene containing a few drops of concentrated sulfuric acid. During the stirring operation which was carried out at room temperature, a reaction took place resulting in the formation of a single liquid phase. The reaction mixture was thereafter distilled at a 3:1 reflux ratio until the pot temperature reached 127° C. after which it was allowed to cool. A small amount of sodium carbonate was then added to the mixture and the distillation completed under vacuum to obtain a 2-(2-furyl)-4,7-dihydro-1,3-dioxepin product as a liquid material. This product boiled at 80° C. at 1.5 millimeters pressure, and had a refractive index n/D of 1.5044 at 25° C. and a carbon content of 62.47 percent as compared to a theoretical content of 65.1 percent.

*Example 2.—2-(3,4-Dihydro-2H-Pyran-2-Yl)-4,7-Dihydro-1,3-Dioxepin*

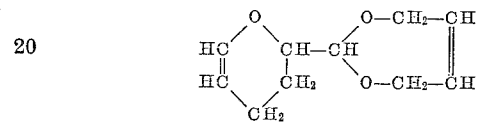

2-butene-1,4-diol (176 grams; 2 moles), 220 grams (2 moles) of 2,2-dimethoxypropane, 224 grams (2 moles) of 3,4-dihydro-2H-pyran-2-carboxaldehyde, 200 milliliters of benzene and a few drops of concentrated sulfuric acid were mixed together with stirring at room temperature. During the stirring, a reaction took place resulting in the formation of a single liquid phase. The reaction mixture was thereafter fractionally distilled under reduced pressure to obtain a 2-(3,4-dihydro-2H-pyran-2-yl)-4,7-dihydro-1,3-dioxepin product as a liquid material. This product boiled at 104° C. at 1.1 millimeters' pressure, and had a refractive index n/D of 1.4968 at 25° C. and carbon and hydrogen contents of 64.64 and 7.66 percent, respectively, as compared to theoretical contents of 65.9 and 7.8 percent.

The new compounds of the present invention have been found to be useful as parasiticides and as constituents in latex polymers and vinyl rubber products. For parasiticidal use, the products are dispersed on a finely divided solid and employed as dusts. Also, such mixtures may be dispersed in water with the aid of a wetting agent and the resulting aqueous suspensions employed as sprays. In other procedures, the products are employed as constituents of solvent solutions, oil-in-water or water-in-oil emulsions or water dispersions with or without the addition of wetting, dispersing and emulsifying agents. In representative operations, aqueous compositions containing 1 part per million by weight of 2-(2-furyl)-4,7-dihydro-1,3-dioxepin give 100 percent kills of carp.

What is claimed is:
1. 2-(2-furyl)-4,7-dihydro-1,3-dioxepin.
2. 2 - (3,4-dihydro-2H-pyran-2-yl)-4,7-dihydro-1,3-dioxepin.

References Cited in the file of this patent

Brannock et al.: "J. Org. Chem.," volume 21, pages 1366–1368 (1956).
Pattison: "J. Org. Chem.," volume 22, page 662 (1957).